United States Patent [19]

Nagaoka et al.

[11] 4,374,615
[45] Feb. 22, 1983

[54] EXPOSURE CONTROL CIRCUIT FOR CAMERAS EQUIPPED WITH SELF-TIMER

[75] Inventors: Shinji Nagaoka; Koji Satoh, both of Shikawatashi, Japan

[73] Assignee: Seiko Koki Kabushiki Kaisha, Japan

[21] Appl. No.: 258,526

[22] Filed: Apr. 28, 1981

[30] Foreign Application Priority Data

Jun. 20, 1980 [JP] Japan .................................. 55-83581

[51] Int. Cl.³ ............................................. G03B 17/40
[52] U.S. Cl. .................................... 354/238; 354/267
[58] Field of Search ...................... 354/29, 30, 36, 38, 354/50, 51, 238, 234, 235, 266, 267, 268

[56] References Cited

U.S. PATENT DOCUMENTS 3,718,077 2/1973 Ono ........................................ 354/51
3,745,902 7/1973 Taguchi ................................. 354/51
3,975,746 8/1976 Beppu ................................... 354/51

Primary Examiner—William B. Perkey
Attorney, Agent, or Firm—Robert E. Burns; Emmanuel J. Lobato; Bruce L. Adams

[57] ABSTRACT

An exposure control circuit for cameras equipped with a self-timer comprises an RC integrating circuit including a capacitor and a resistance for determining an automatic shutter releasing period and a time constant setting circuit employing the same capacitor for switching from the self-timer operating mode to the exposure time control mode. Exposure time is determined by the capacitor and the output signal of a photoelectric conversion circuit. This circuit construction allows a single electromagnet to control both an automatic shutter releasing period and exposure, and a single capacitor to function in three time constant setting operations.

7 Claims, 5 Drawing Figures

EXPOSURE CONTROL CIRCUIT FOR CAMERAS EQUIPPED WITH SELF-TIMER

BACKGROUND OF THE INVENTION

This invention relates to an exposure control circuit for cameras equipped with a self-timer wherein a single capacitor functions in time constant setting for the self-timer, controlling exposure and setting the time from the completion of self-timer operation to the start of exposure control.

Methods of electrical self-timer time control have been proposed and some of them are being practiced. Furthermore, a self-timer circuit employing a single capacitor for both time setting of a self-timer and time setting of exposure control is proposed in Japanese Utility Model Publication No. 207/78, wherein the time setting of the self-timer is attained by charging the capacitor while the exposure time is controlled by discharging the capacitor. In a shutter equipped with such an electric self-timer comprising a dual-purpose capacitor, an electromagnet is actuated by a self-timer completion signal to start an exposure control starting member thus switching the circuit from a self-timer operating mode to an exposure control mode. Therefore, the time required for the mechanical operation in the switching from the self-timer operation to the exposure control is required to be electrically set. In the conventional methods, a separate time constant setting circuit or the like is provided for setting a time from the completion of the self-timer operation to the start of the exposure control.

SUMMARY OF THE INVENTION

According to the present invention, there is provided an exposure control circuit having no separate time setting circuit such as is necessary in the conventional circuits, whereas comprising a single capacitor adapted to function in setting time for a self-timer, in setting time for exposure and, further, in setting time between the completion of self-timer operation and the start of exposure control.

Accordingly, an object of the present invention is to make a single capacitor to function in the self-timer operation by charging the condenser, in the setting the time for switching the circuit from the self-timer operating mode to the exposure control mode by discharging the capacitor and in exposure control by charging the same capacitor again, instead of providing separate capacitors for the respective purposes, thus using a single capacitor for three different time setting operations.

Another object of the present invention is to provide a compact shutter construction for incorporating the shutter into a camera by applying the circuit of the present invention to a shutter having a single electromagnet both for controlling self-timer operation and exposure.

DETAILED DESCRIPTION

Figure 1:
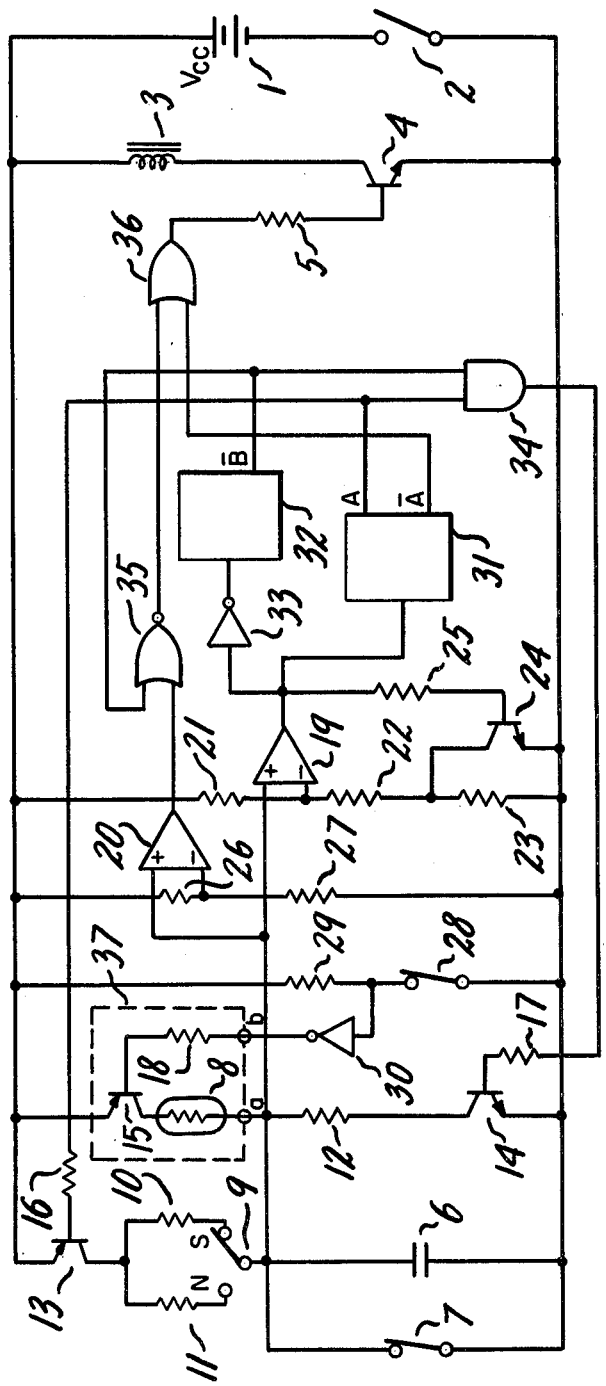
FIG. 1 is a circuit diagram of an embodiment of the exposure control circuit according to the present invention.

Referring now particularly to FIG. 1, a constant-voltage regulated power supply 1 provides a supply voltage Vcc. Reference numeral 2 designates a main switch. An electromagnet 3 is employed both for self-timer operation and exposure control. A transistor 4 drives the electromagnet 3. Reference numeral 5 designates a base resistance of the transistor 4. A capacitor 6 functions in setting time both for self-timer operation and exposure control and, in addition, in setting time from the completion of self-timer operation to the start of exposure control. The self-timer operating time is set by charging the capacitor, while the time from the completion of self-timer operation to the start of exposure control is set by discharging the capacitor. Exposure time is determined by charging the capacitor again. A switch 7 is provided for starting the operation of the self-timer. When the switch 7 is opened, the operation of the self-timer starts, whereas while the switch 7 is closed, the capacitor 6 is short-circuited so that the capacitor 6 will not be charged. A photoconductive element 8 converts the luminance information of an object to be photographed into an electric signal. A mode selector switch 9 is turned to the S side to connect a resistance 10 to the circuit in using the self-timer, and the switch 9 is turned to N side to the connect a resistance 11 to the circuit in the manual shutter releasing mode. A resistance 12 makes the capacitor 6 discharge to set a time from the completion of self-timer operation to the start of exposure control. Reference numerals 13, 14 and 15 designate switching transistors. While the self-timer is operating, the transistor 13 is closed while the transistors 14 and 15 are opened. During the setting of the time between the completion of self-timer operation and the start of exposure control, the transistor 15 is closed while the transistors 13 and 14 are opened. Reference numerals 16, 17 and 18 designate base resistances of the transistors 13, 14 and 15 respectively.

Reference numeral 19 designates a comparator for self-timer operating time setting and setting time between the completion of self-timer operation and the start of exposure control. Reference numeral 20 designates a comparator for exposure time setting. The non-inverting inputs of the respective comparators 19 and 20 are connected to the positive pole of the capacitor 6. Resistances 21, 22 and 23 determine the reference voltage of the comparator 19. The junction of the resistances 21 and 22 is connected to the inverting input of the comparator 19. A transistor 24 is provided for short-circuiting the resistance 23 to change the reference voltage of the comparator 19. While the output of the comparator 19 is a low level, the transistor 24 remains opened so that the reference voltage is $v_1$ determined by the resistances 21, 22 and 23. When the capacitor charging voltage rises to a value exceeding the reference voltage $v_1$, the output of the comparator 19 becomes high level and the transistor 24 is closed so that the reference voltage becomes $v_2$ determined by the resistances 21 and 22. Reference numeral 25 designates a base resistance of the transistor 24. Resistances 26 and 27 determine the reference voltage $v_3$ of the comparator 20. The junction of the resistances 26 and 27 is connected to the inverting input of the comparator 20. The relative magnitude between the reference voltages $v_1$, $v_2$ and $v_3$ is: $v_2 < v_1 < v_3$.

A timing switch 28 is opened in synchronism with the start of exposure and closes the transistor 15 through an inverter 30. The input of the inverter 30 is connected to the junction of a resistance 29 and the timing switch 28. The outputs of latch circuits 31 and 32 employing flip flop circuits are inverted when a leading edge of a pulse is applied. The input of the latch circuit 31 is connected to the output of the comparator 19. The outputs A and $\overline{A}$ of the latch circuit 31 are inverted from low level to high level and from high level to low level, respectively, when the output of the comparator 19 changes from low level to high level. The input of the latch circuit 32 is connected to the output of the comparator 19 through an inverter 33. The output $\overline{B}$ of the latch circuit 32 is inverted from high level to low level with the initial change of the output of the inverter 33 from low level to high level. The output A of the latch circuit 31 and the output $\overline{B}$ of the latch circuit 32 are applied to an AND circuit 34. The output of the AND circuit 34 controls the transistor 14. The output of the comparator 20 and the output $\overline{B}$ of the latch circuit 32 are applied to a NOR circuit 35. The output of the NOR circuit 35 and the output $\overline{A}$ of the latch circuit 31 are applied to an OR circuit 36. The output of the OR circuit 36 controls the transistor 4 provided for driving the electromagnet 3.

Figure 2:
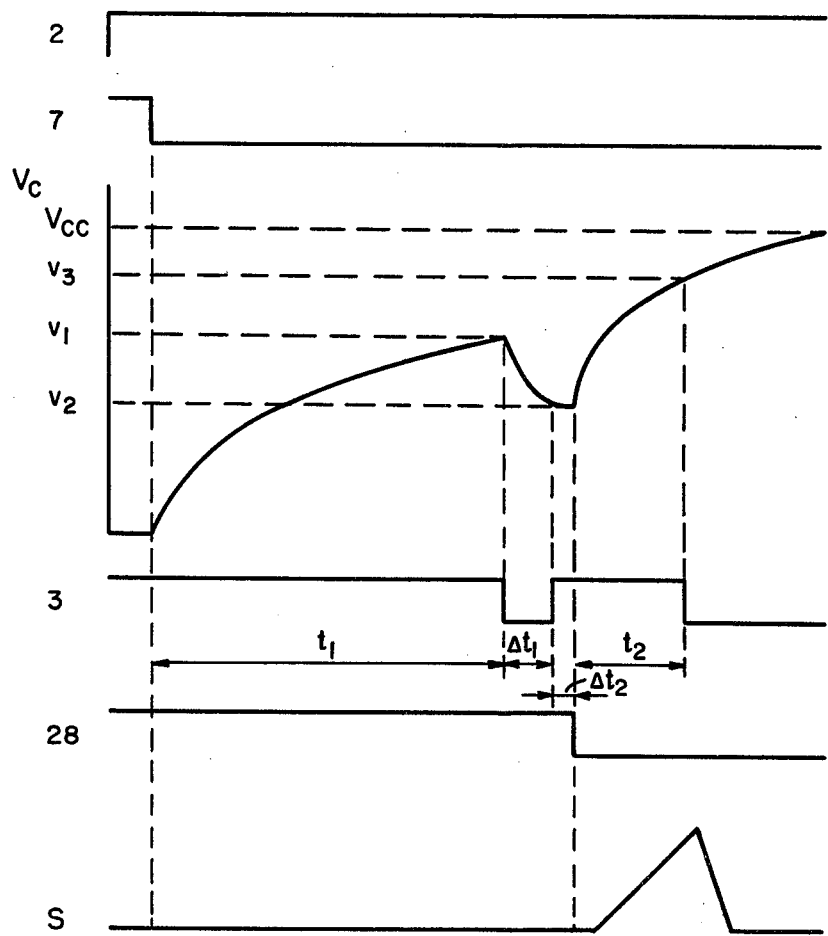
FIGS. 2 and 3 are diagrams explaining the operation of the circuit of FIG. 1.
Figure 3:
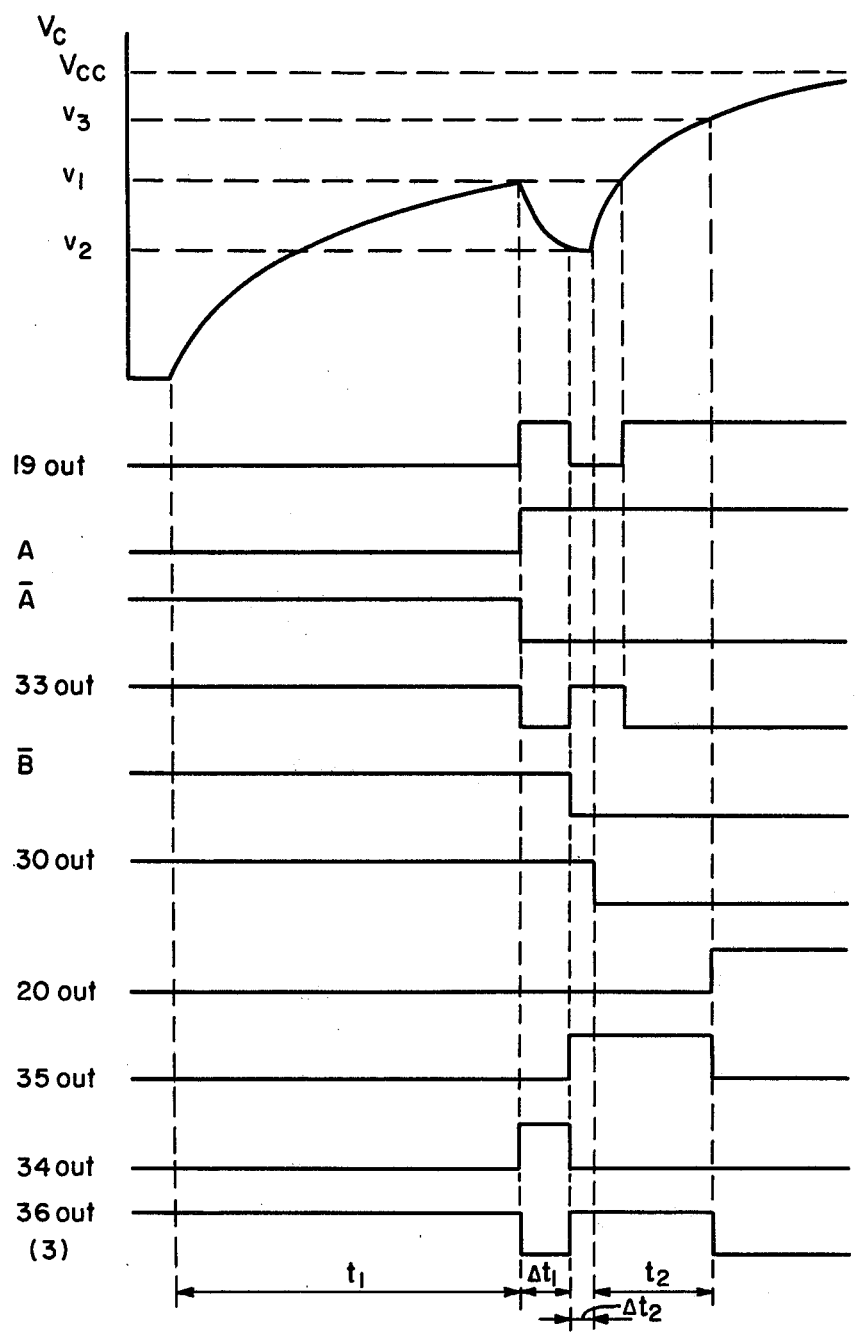

Referring to FIGS. 2 and 3 illustrating timing charts of the operation of the circuit of FIG. 1, operation of the circuit of FIG. 1 will be explained hereinafter. FIG. 2 illustrates the operation of switches with respect to the voltage $V_c$ of the capacitor 6. FIG. 3 illustrates the levels of the outputs of the respective circuit elements with respect to the voltage $V_c$ of the capacitor 6. When the main switch 2 is closed interlocking with the depression of the shutter release button with the switches 7 and 28 closed as shown in FIG. 1, the non-inverting inputs of the comparators 19 and 20 are at a low level, consequently, the outputs of the comparators 19 and 20 also are at a low level. The transistor 24 is opened since the output of the comparator 19 is at a low level. The reference voltage of the comparator 19 becomes $v_1$ determined by the resistances 21, 22 and 23. The latch circuits 31 and 32 maintain their output A at a low level, $\overline{A}$ at a high level and $\overline{B}$ at a high level, respectively, until the leading edge of a pulse is applied to them since the leading edge of the pulse is not applied to the latch circuits 31 and 32. The transistor 13 is closed since the output A of the latch circuit 31 is at a low level. The transistor 14 is opened since the output of the AND 34 circuit is at a low level. Whereas, the output of the OR circuit 36 is at a high level since the output $\overline{A}$ is at a high level so that the transistor 4 is closed to energize the electromagnet 3. The output of the inverter 30 is at a high level and the transistor 15 is opened since the switch 28 is closed. Thus, the transistors 4 and 13 are closed while the transistors 14, 15 and 24 are opened.

As the shutter releasing button is further depressed, the switch 7 is opened to start charging the capacitor 6 through the transistor 13, resistance 10 and switch 9, thus the capacitor 6 starts functioning as a self-timer time setting capacitor. When the capacitor voltage $V_c$ reaches a charging voltage $v_1$ as shown in FIG. 3, the output of the comparator 19 is inverted from low level to high level, which causes the transistor 24 to close to short-circuit the resistance 23. Consequently, the reference voltage applied to the comparator 19 becomes $v_2$ determined by the resistances 21 and 22. In addition, the operation of the latch circuit 31 causes the output A and $\overline{A}$ to invert from low level to high level and from high level to low level respectively. The output $\overline{B}$ remains at a high level since the trailing edge of the pulse is applied to the latch circuit 32. Although the transistor 13 is opened since the output A of the latch circuit 31 is at a high level, the output of the AND circuit 34 becomes high so that the transistor 14 is closed. Furthermore, the output of the OR circuit 36 is at a low level since the output of the NOR circuit 35 is at a low level, so that the transistor 4 is opened, and consequently, the electromagnet 3 becomes unmagnetized. With the transistor 14 closed, the charged voltage of the capacitor 6 is discharged through the resistance 12 and the transistor 14. When the charged voltage $V_c$ is reduced to $v_2$, the output of the comparator 19 is inverted from high level to low level and the leading edge of the pulse is applied to the latch circuit 32 through the inverter 33 so that the output $\overline{B}$ is inverted from the high level to the low level. Simultaneously, the output of the AND circuit 34 is inverted to the low level and the transistor 14 is opened. The output of the NOR circuit 35 is inverted to the high level to close the transistor 4 so that the electromagnet 3 is magnetized. The electromagnet 3 remains demagnetized during a period $\Delta t_1$ shown in FIGS. 2 and 3. The demagnetization of the electromagnet 3 for a fixed period of time ($\Delta t_1$) allows a mechanism, not shown, to start opening the shutter (S shown in FIG. 2) simultaneously opening the timing switch 28.

The period as designated by $\Delta t_2$ in FIGS. 2 and 3 is a mechanical delay time required for opening the timing switch 28. When the timing switch 28 is opened, the circuit is switched to the exposure time control mode. The transistors 13 and 14 are opened, the transistor 15 is closed and the capacitor 6 is charged to a higher voltage than the charging voltage $v_2$ through the photoconductive element 8. When the charging voltage reaches the reference voltage $v_3$ of the comparator 20, the output of the comparator 20 is inverted from low level to high level so that the output of the NOR circuit 35 is inverted to the low level. Since the output $\overline{A}$ of the latch circuit 31 is at a low level, the output of the OR circuit is inverted to the low level and the transistor 4 is opened so that the electromagnet 3 is demagnetized. At this moment, the exposure is completed and the shutter closes as shown in FIG. 2. The inversion of the output of the comparator 19 is repeated between low level and high level, however, no unnecessary operation of the comparator 19 is applied to the AND circuit 34, NOR circuit 35 and OR circuit 36 since the latch circuits 31 and 32 are interposed.

As hereinbefore described, the period between the opening of the switch 7 and the first demagnetization of the electromagnet 3, i.e. the time $t_1$ shown in FIGS. 2 and 3, is the self-timer operating time, which is determined by the values of the capacitor 6 and the resistance 10 respectively. The self-timer operating time can be adjusted also by the input voltage $v_1$ for inverting the comparator 19. The time differential $\Delta t_1$ between the self-timer operation completing time and the exposure starting time is determined by the values of the capacitor 6 and the resistance 12 respectively. The time differential $\Delta t_1$ be adjusted also by the input voltage $v_2$ for inverting the comparator 19. The exposure time $t_2$ from the opening of the timing switch 28 to the demagnetization of the electromagnet 3 is determined by the values of the capacitor 6 and the photoconductive element 8 respectively. The resistance of the photoconductive element 8 varies in accordance with the luminance of the object to be photographed. The circuit can be designed to automatically provide a correct exposure time. The input voltage $v_3$ for inverting the comparator 20 can be utilized for introducing information, such as the film sensitivity or aperture, in addition to the adjustment of time.

Figure 4:
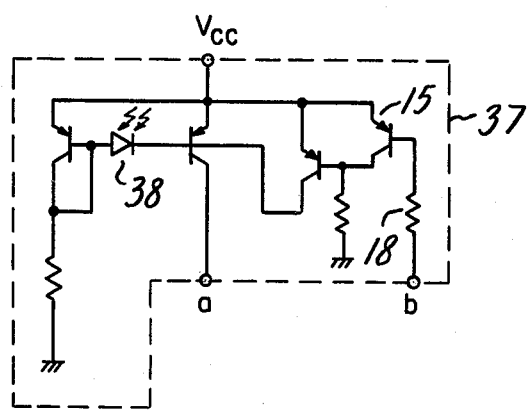
FIG. 4 is a light receiving circuit comprising a photodiode.
Figure 5:
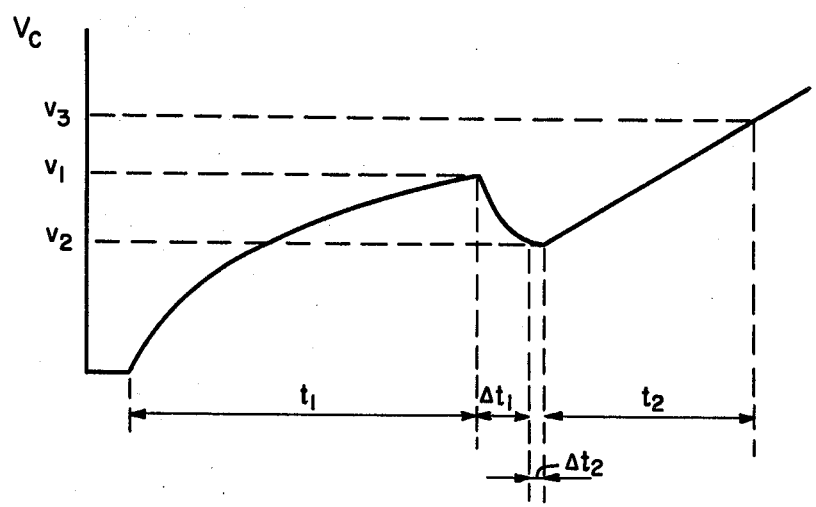
FIG. 5 is a diagram illustrating the waveform of the condenser charging voltage when the light receiving circuit of FIG. 4 is employed.

When the self-timer is not used, the mode selector switch 9 is turned to the side N. Manual shutter releasing operation is allowed by reducing the time corresponding to the time $t_1$ of FIG. 2 and 3 to a great extent by setting the resistance 11 to an extremely smaller value relative to the value of the resistance 10. The light receiving element is not limited to a photoconductive element, but a photovoltaic element, such as a photodiode or a phototransistor, may be used. The light receiving circuit of FIG. 4, corresponding to the block 37 encircled by broken lines in FIG. 1, employs a photodiode 38. When the block 37 of FIG. 1 is replaced with the block of FIG. 4, the capacitor 6 is charged by constant-current charging during the exposure time control. The wave form of the charging voltage $V_c$ during the constant-current charging is illustrated in FIG. 5.

The main switch 2 holding means may be either electrical or mechanical. The electrical means will comprise a power source holding circuit capable of supplying electricity to the circuit until the series of shutter releasing operations are completed. The resetting of the latch circuits 31 and 32 may as well be performed during the time between the closing of the main switch 2 interlocking with the depression of the shutter releasing button and the opening of the self-timer starting switch 7.

It will be obvious from what has been described hereinbefore that the exposure control circuit of the present invention comprises a single capacitor commonly functioning both in the self-time control circuit and the exposure time control circuit, and furthermore, the same capacitor can be used for setting the time between the completion of the self-timer operation and the starting of the exposure control, thus reducing the number of component parts and also the manufacturing cost. Still further, the exposure control circuit of the present invention can be constructed having reduced dimensions and is advantageous for incorporating into a small-sized apparatus, such as a camera, having less space for accommodating the parts.

We claim:

1. An exposure control circuit, for a camera, comprising:
an electrical self-timer operation control circuit for setting a self-timer operating time period by means of a time setting circuit including a resistance and a condenser; an exposure time control circuit capable of automatically determining an exposure time by means of the output of a photoelectric element and including said condenser; and means for controlling a charge on said condenser so as to function as the condenser for said self-timer operation control circuit, the condenser for setting a time period between the completion of the operation of a self-timer and the starting of the exposure operation, and as the time-setting condenser of said exposure control circuit.

2. An exposure control circuit as set forth in claim 1 characterized in that a self-timer operating time period is set by the charging of said condenser, the time period between the completion of the self-timer operation and the start of the exposure controlling operation is set by the discharging of said condenser, and an exposure time period is determined by the recharging of said condenser.

3. An exposure control circuit as set forth in claim 1 characterized in that the charging of said condenser for determining an exposure time period is constant-current charging.

4. An exposure control circuit as set forth in claim 1 characterized in that the output terminals of said self-timer operation control circuit and said exposure time period control circuit respectively are connected to a single electromagnet, and said electromagnet is demagnetized for a fixed period of time by a self-timer operation completion signal, magnetized again after said fixed period of time and demagnetized again by a completion signal provided by said exposure time period control circuit.

5. An exposure control circuit, for a camera, having a self-timer mode and an exposure control mode, said exposure control circuit comprising:
a capacitor;
means operative in the self-timer mode for charging said capacitor to determine the duration of the self-timer mode of exposure control circuit operation;
means operative at the completion of the self-timer mode for partially discharging said capacitor to determine the duration of a time interval between the completion of the self-timer mode and the start of the exposure control mode of exposure control circuit operation; and
means operative in the exposure control mode for charging said capacitor to determine the duration of the exposure control mode of exposure control circuit operation.

6. An exposure control circuit as set forth in claim 5, wherein said means for charging said capacitor to determine the duration of the exposure control mode is effective to charge said capacitor in a constant-current condition.

7. An exposure control circuit as set forth in claim 5 or 6, further comprising:
a single electromagnet; and
means for magnetizing said single electromagnet during the self-timer mode and for demagnetizing said electromagnet for a fixed period of time at the termination of the self-timer mode and for subsequently magnetizing said electromagnet after the fixed period of time and for demagnetizing said electromagnet at the completion of exposure.

* * * * *